Dec. 28, 1965  H. P. HEINISCH  3,225,901
DRAPER CHAIN STRUCTURE
Filed Sept. 30, 1964
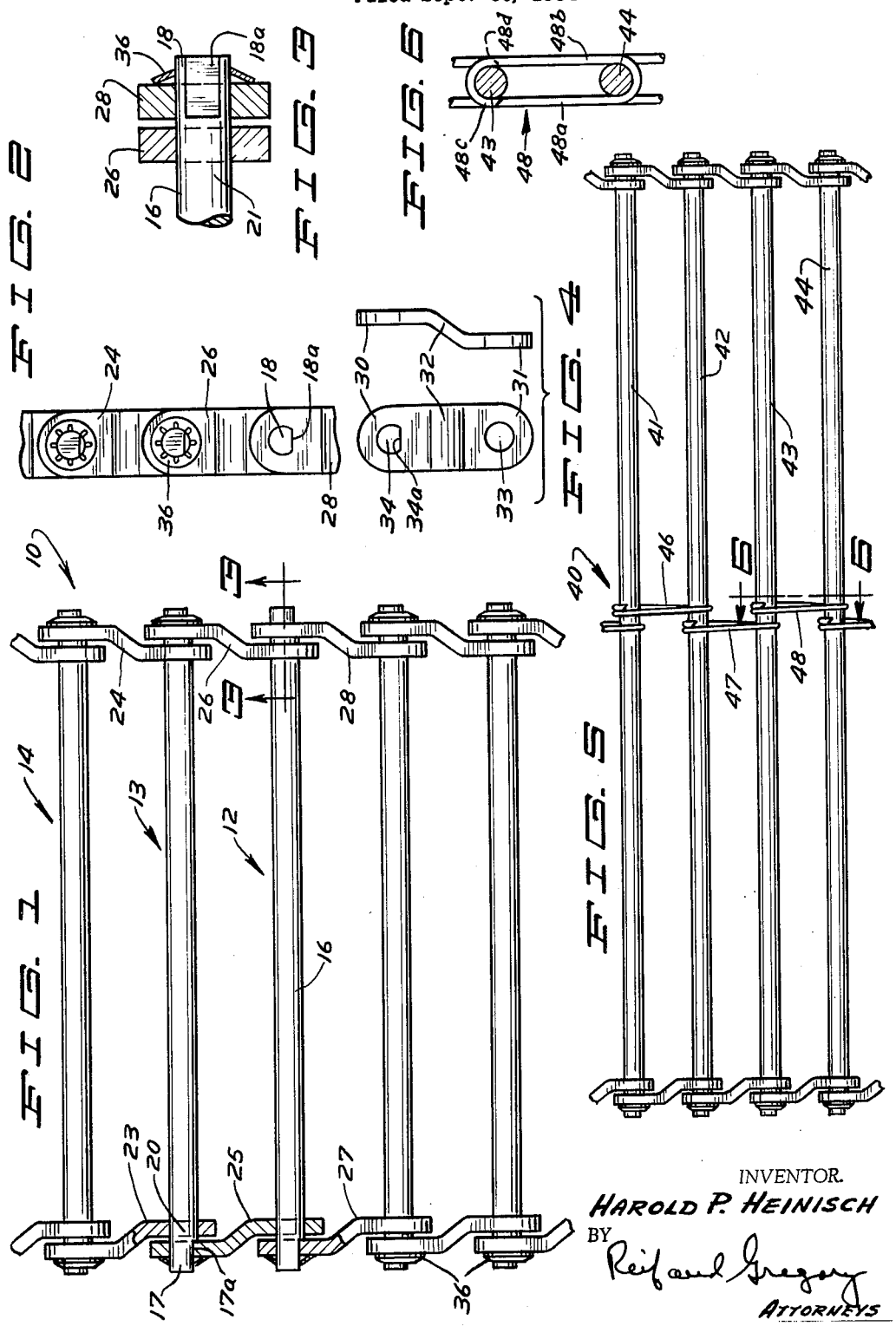
INVENTOR.
HAROLD P. HEINISCH
BY
Reif and Gregory
ATTORNEYS

United States Patent Office 3,225,901
Patented Dec. 28, 1965

3,225,901
DRAPER CHAIN STRUCTURE
Harold P. Heinisch, Braham, Minn., assignor to Dahlman Manufacturing & Sales, Inc., Braham, Minn., a corporation of Minnesota
Filed Sept. 30, 1964, Ser. No. 400,331
1 Claim. (Cl. 198—195)

This invention relates to improvement in the structure of an endless belt or chain such as is used to form a conveyor belt as on potato harvesting equipment. Such a belt is commonly referred to as a draper chain.

The commonly used type of draper chain is formed of links having straight cross rod or body portions and having rearwardly angled arm portions at either end thereof, said arm portions having reversely curved free end portions forming hook portions. Said hook portions engage cross rod portions of the respective links adjacent therebehind. The arms of said links are commonly of a length to represent a single pitch of the sprockets over which said links pass.

A draper chain of the above construction becomes badly worn at the inner side or bearing surface portion of said hook portions. In reversely bending the free end portions of said arms, transverse wrinkles or creases form across the bearing surface. In operation said wrinkles and creases on said bearing surfaces in wearing away tend to leave a non-uniform surface. Thus the pitch of the various links is changed and loosening of the entire draper chain results relative to the supporting sprockets. There is also a tendency for breakage at the points of said bearing surface areas. The breakage of a link results in a stoppage of the chain. Replacement is time consuming. In repairing the chain, sprockets must be losened to provide sufficient slack to repair the broken chain.

It is an object of this invention to provide an improved construction in a draper chain for longer wear and more uniform pitch.

It is another object of this invention to provide for easier and quicker replacement of broken link portions and to provide for the continued operation of a draper chain with a broken link.

It is also an object of this invention to provide a draper chain construction which lends itself to construction from less expensive alloy steel than a conventional type of link construction, requiring less heat treatment and providing longer lasting service due to a straight link construction requiring no reverse bending of parts.

It is a further object of this invention to provide a draper chain construction resulting in a more uniform upper run surface for less bouncing and less bruising of the crop moving over the chain.

These and other objects and advantages of the invention will be fully set forth in the following description made in connection with the accompanying drawings in which like reference characters refer to similar parts throughout the several views and in which:

FIG. 1 is a fragmentary top plan view partially in section;

FIG. 2 is a fragmentary view in end elevation;

FIG. 3 is a broken view in horizontal section taken on line 3—3 of FIG. 1 as indicated;

FIG. 4 is a composite view showing a front and side elevation of a connecting bar;

FIG. 5 is a fragmentary top plan view embodying a modification;

FIG. 6 is a broken view in vertical section taken on line 6—6 of FIG. 5 as indicated.

Referring to the drawings and particularly to FIGS. 1–3, a fragmentary portion of a draper chain embodying the invention herein is indicated generaly by the character 10.

The respective links of said draper chain 10 are identical in construction. For purpose of illustration representative of said links are indicated by the characters 12, 13 and 14 with the link 12 being described in some detail.

Said link 12 comprises a rod 16 of suitable material. Said rods commonly have a length of 24 to 30 inches, and although these are conventionally cylindrical in form, various cross sectional forms are within the scope of the invention herein. As indicated in FIGS. 1 and 3, the terminal or end portions 17 and 18 of said rod 16 are formed to be non-cylindrical. In the present embodiment, a flat side 17a and 18a at either terminal portion provides the non-cylindrical form.

At either end portion of said rod 16 adjacent the inner ends of said non-cylindrical terminal portions are cylindrical portions 20 and 21 forming bearing surfaces. In a cylindrical rod such as rod 16, as here shown, said bearing surfaces are a matter of designation. In a non-cylindrical rod said bearing surface areas will be particularly formed and thus will be more clearly defined.

A link comprises a rod with bars carried at either end thereof serving to connect one rod with another. Said connecting bars are identical in construction and representative of said bars are indicated by the characters 23–28. Said bars in opposed relation in operating position are disposed to be mirror images of one another.

The bar 25 will be described in detail. Said bar 25 may take various specific forms. It is indicated here as being substantially rectangular in plan and is upset longitudinally in a relatively simple bending operation to have its respective end portions 30 and 31 in parallel planes with an angled connecting portion 32 therebetween. Said end portion 30 has an aperture 34 extending therethrough. Said aperture will define an opening that will frictionally seat on a non-cylindrical terminal portion of said rod 16. In the present embodiment, said aperture 34 is substantially circular in form having a flat side portion 34a therein corresponding to the flat sides of said terminal road portions 17 and 18. Hence with a terminal portion 17a or 18a disposed into said aperture 34 there is a non-rotatable locking engagement between the end portion 34 of said bar 25 and said rod 16.

The end portion 31 of said bar 25 has a circular aperture 33 extending therethrough of a size to be seated as about the cylindrical portions 20 or 21 of said rod 16 to form a bearing surface therefor and to be freely rotatable thereabout.

Carried at the outer ends of said rod to retain said bars thereon are press-on lock washers 36 of a conventional design.

To assembly the draper chain 10, rod 16 is taken in hand. The connecting bars 25 and 26 are arranged to have their respective circular apertures 33 journaled about the cylindrical portions 20 and 21. When thus positioned it will be noted that the central angled portions of said bars will be inclined outwardly away from one another. It will be further noted here that rod 16 with the connecting bars 25 and 26 journaled thereon comprises a link. Each rod of said draper chain will thus be assembled.

The ends of said connecting bars 25 and 26 having non-circular openings therein are pressed onto the non-cylindrical terminal portions of the adjacent rod, said adjacent rod first having the circular ends of a pair of connecting bars journaled thereon.

Lock washers are pressed onto the ends of said rods to retain ends of connecting bars thereon.

Thus the links are connected one with another and in this manner the draper chain as a whole is assembled.

In connection with the construction of the connecting bars, they are upset in a simple forming operation as compared to the reverse bending of a conventional link which requires a more expensive steel alloy to stand up and take the heat treatment necessary with the bending operation.

*Operation*

It will be noted in view of the above description that each link is freely swingable relative to the adjacent link. The free swinging linkage of the draper chain very readily spreads any stress resulting from a load condition and provides a freely yielding surface in the runs of the draper chain. In a conventional type of draper chain stress tends to develop between adjacent links because of the less efficient bearing surface formed in the reversely curved connecting end portions of the arms of the respective links.

Owing to the nicely formed bearing surfaces in the connecting bars, there is not only less wear between the adjacent bearing surfaces but there is a uniformity of whatever wear is present which results in a uniform pitch being retained throughout the draper chain. The uniformity of wear provides for a longer lasting draper chain as a whole and results in less breakage of any link.

If the rod of a link does break, the connecting bars still hold the draper chain together for a continuation of its operation until it is convenient to stop for repairs. With a conventional type of draper chain, the draper chain separates upon breakage and stoppage is immediate. In replacing a rod in the event of breakage, there is no need to partially remove the draper chain from its supporting sprockets or to loosen the chain. There is a straight insertion through the related connecting bars. The broken rod is readily removed by forcing off the lock washers and sliding off the adjacent ends of the connecting bars.

*Modification*

Frequently a rod having a width of 55 to 65 inches is used where a wide draper chain is desired. Rods of this length would have a tendency to bow or separate.

Referring to FIG. 5 an embodiment of the invention indicated by the character 40 is here shown in which rods 41–44 are indicated having increased length. In all other respects said rods 41–44 are identical with those shown in connection with said draper chain 10.

To hold said rods 41–44 in uniformly spaced relation, clip or link members such as indicated by the characters 46–48 are used to connect the respective rods. The clip members are of identical construction. With reference to representative clip 48, said clip is formed of suitable somewhat resilient or spring-like rod material of which a length is reversely bent forming sides 48a and 48b with said sides having reversely curved free end portions 48c and 48d with these curved portions being superposed overlying one another and being adapted to be sprung apart to form an end opening. Thus the sides of said members may be grasped and pulled apart sufficiently to slip the clip member over a pair of adjacent rods with the clip members embracing adjacent pairs of said rods in an overlapping arrangement as illustrated in FIG. 5.

Thus it is seen that I have provided a substantial improvement in the connection of the linkage of a draper chain, this improvement resulting in a simpler draper chain construction providing greater uniformity in wear, more flexibility in the chain and greater freedom from breakdowns and work stoppages.

It will of course be understood that various changes may be made in the form, details, arrangement and proportions of the parts, without departing from the scope of applicant's invention which, generally stated, consists in a device capable of carrying out the objects above set forth in the parts and combinations of parts disclosed and defined in the appended claim.

What I claim is:

An endless draper chain of the character indicated having in combination
  a plurality of links respectively comprising
  a rod,
  spaced bearing surface areas spaced inwardly from the respective end portions of said rod,
  non-cylindrical portions of said rod comprising flat side portions adjacent said bearing surface areas,
  a pair of longitudinally upset connecting bars,
  one end portion of each of said bars having cylindrical apertures therethrough,
  the other end portions of each of said connecting bars having non-cylindrical apertures therethrough each having a flat side therein to receive said non-cylindrical rod portions therein to accommodate and mate with said flat side portions,
  said bearing surface areas of said rod being journaled in said cylindrical apertures of said bars, said bars being disposed in spaced relation to accommodate and support said rod,
  a second rod identical to said first mentioned rod,
  a second pair of connecting bars identical to said first mentioned pair of connecting bars,
  said second rod having its bearing surfaces journaled in said cylindrical apertures of said second pair of connecting bars, and
  the non-cylindrical portions of said second rod being disposed in said non-cylindrical apertures of said first mentioned pairs of connecting bars whereby said links are interconnected.

References Cited by the Examiner

UNITED STATES PATENTS

| | | | |
|---|---|---|---|
| 2,262,894 | 11/1941 | Johnson et al. | 198—195 |
| 2,703,644 | 3/1955 | Van Lake | 198—195 |
| 2,778,480 | 1/1957 | Dobbins | 198—195 |
| 3,160,264 | 12/1964 | Raybould | 198—195 |

FOREIGN PATENTS 118,790   8/1944   Australia.

SAMUEL F. COLEMAN, *Primary Examiner.*

R. M. WALKER, *Assistant Examiner.*